United States Patent [19]

Fujimura et al.

[11] Patent Number: 4,509,071

[45] Date of Patent: Apr. 2, 1985

[54] DOUBLE-SCANNING NON-INTERLACE TELEVISION RECEIVER

[75] Inventors: Yasushi Fujimura, Musashino; Takashi Okada; Yutaka Tanaka, both of Yokohama; Yasunari Ikeda, Funabashi, all of Japan

[73] Assignee: Sony Corporation, Tokyo, Japan

[21] Appl. No.: 439,206

[22] Filed: Nov. 4, 1982

[30] Foreign Application Priority Data

Nov. 5, 1981 [JP] Japan ................... 56-177459

[51] Int. Cl.³ ............................... H04N 5/44
[52] U.S. Cl. ........................ 358/11; 358/140
[58] Field of Search .................. 358/11, 312, 140

[56] References Cited

U.S. PATENT DOCUMENTS 4,400,719 8/1983 Powers .................. 358/11

OTHER PUBLICATIONS van Buul, M. C. W. et al., "Standards Conv. of a Videophone Signal with 313 Lines into a TV Signal with 625 Lines", Philips Research Reports, vol. 29, No. 5, pp. 413–428, 10/74.

Rossi, John, "Color Decoding a PCM NTSC Television Signal", Journal of the SMPTE, vol. 83, No. 6, Jun., 1974, p. 489.

Primary Examiner—Michael A. Masinick
Attorney, Agent, or Firm—Lewis H. Eslinger; Alvin Sinderbrand

[57] ABSTRACT

A double-scanning non-interlace television receiver for receiving an interlace television signal having alternating odd and even fields of scan lines which are normally interlaced, as displayed, comprises a receiver circuit which receives the interlace television signal and generates received line signals representative of the scan lines of a field being received, a visual display apparatus, and a non-interlace converting circuit connected to the receiver circuit which generates an averaged line signal from two consecutive received line signals and serially supplies the averaged line signal and the consecutive received line signals to the visual display apparatus for display by the latter, with each averaged line signal being supplied and displayed between the respective received line signals.

21 Claims, 20 Drawing Figures

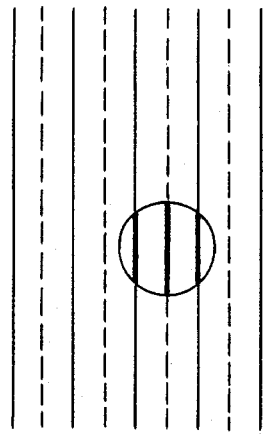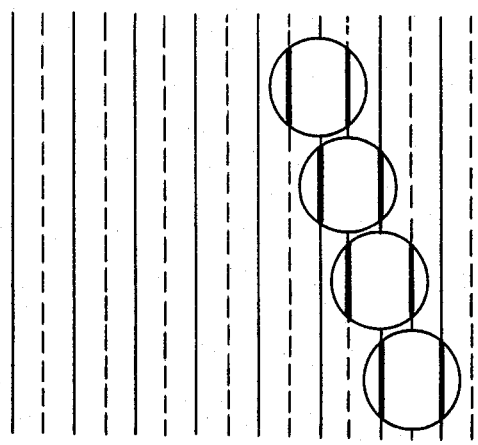
FIG.1a
FIG.1b
FIG.5a
FIG.5b
FIG.5c
FIG.5d
FIG.5e
FIG.5f

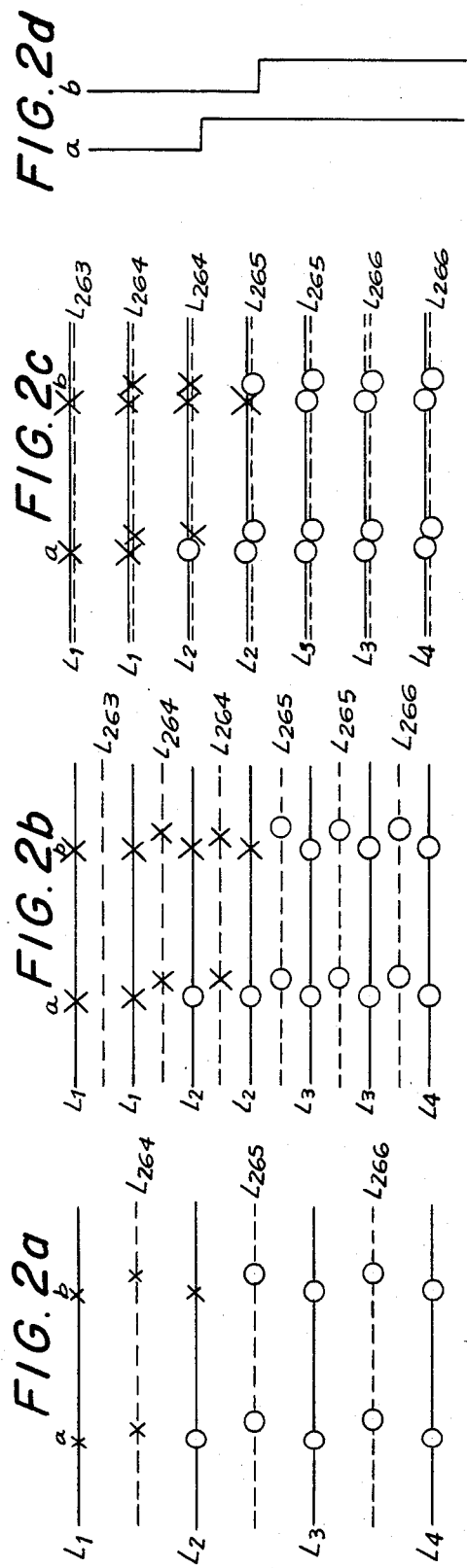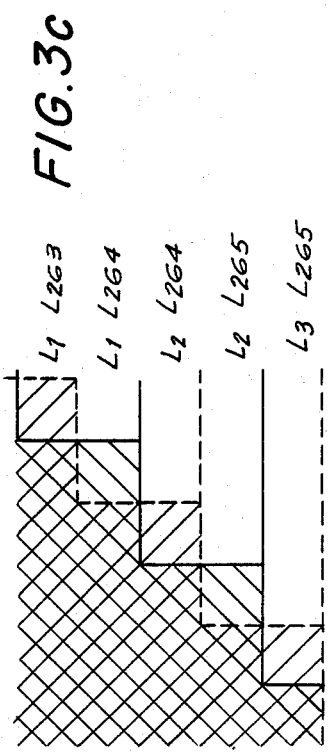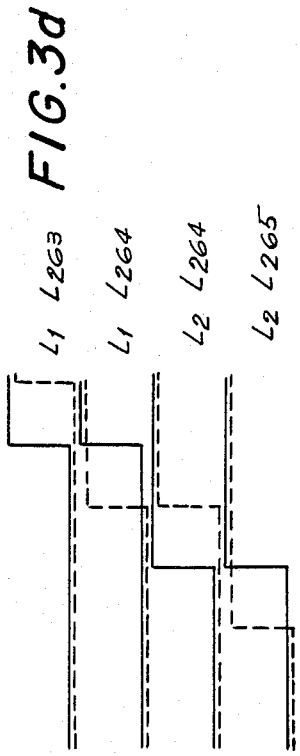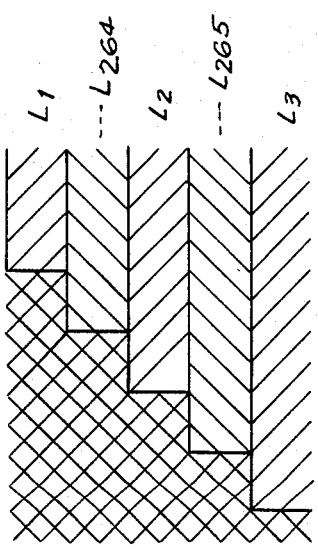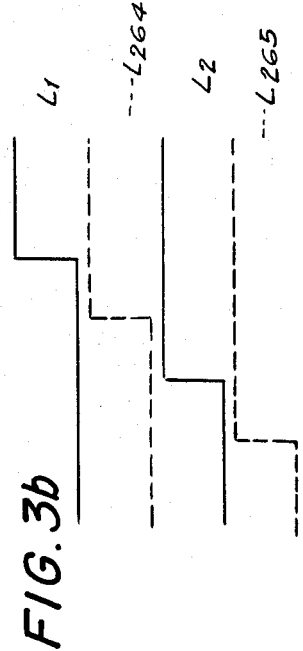

DOUBLE-SCANNING NON-INTERLACE TELEVISION RECEIVER

CROSS-REFERENCE TO RELATED APPLICATIONS

Reference is made to copending applications U.S. Ser. No. 440,985 and U.S. Ser. No. 445,465, assigned to the assignee of the present application, and containing related subject matter.

BACKGROUND OF THE INVENTION

1. Field of the Invention

This invention relates to television receivers, and more particularly, to a double-scanning non-interlace television receiver for displaying a received interlace television signal.

2. Description of the Prior Art

A television picture is a two-dimensional picture formed by scanning a one-dimensional time sequence signal. The time sequence signal is perceived as a picture which is continuous in time as well as space because of the time and space integrating functions of human vision. If the number of pictures displayed on a television screen per second is less than the threshold of human vision, the time integration effect is insufficient, and the picture is perceived as flickering. If the number of scanning lines comprising a television picture is below the threshold of human vision, the space integration effect of human vision is insufficient to produce an acceptable picture. The television picture is perceived as coarse, and the scanning lines are conspicuous.

Interlace scanning television systems, such as the NTSC system or the like, attempt to reduce flicker by increasing the number of pictures per second beyond the threshold of human vision. However, the television picture displayed with such an interlace scanning system is inferior to a television picture displayed with a non-interlace scanning system in which, for example, 525 lines are scanned. The interlace television picture is inferior because the space integration effect of human vision is not as effective in such an instance.

The space integration effect of human vision is not effective in the perception of a rapidly moving object displayed by an interlace scanning system, such as the NTSC system. If the object moves more quickly than the time required for the system to scan the second field comprising a frame, only the lines of the first field display the object. One half of the scanning lines, or 262.5 scanning lines, are used. The image, accordingly, becomes coarse. This effect is even more pronounced in a television receiver with a large screen. Although there are various factors which determine the quality of a television picture, one of the most important factors is the coarseness of each scanning line.

One solution to the problem of the coarseness of a scanning line is to double the number of scanning lines with an interlace system 1050 scanning lines. A second solution is to scan every line with a non-interlace system having 525 consecutively scanned lines. However, there are problems with displaying an interlace television signal having 525 scanning lines, such as the NTSC system, on receiver systems constructed in accord with such suggestions. In an interlace receiver system with 1050 scanning lines, a flicker occurs between the upper and lower portions of a scanning line. In a non-interlace receiver system with 525 scanning lines, a straight oblique line will be displayed as a zig-zag line because of the deviation between the position of the scanning line when it is repeated and the position when it is first displayed, since the same picture signal generates the two scanning lines.

OBJECTS AND SUMMARY OF THE INVENTION

Accordingly, it is an object of the present invention to provide a double-scanning non-interlace television receiver which can eliminate the aforesaid problems inherent in prior art television receivers.

It is another object of the present invention to provide a double-scanning non-interlace television receiver in which a picture signal of a scanning line to be added between two consecutive scanning lines is derived as the mean or average value between the scanning lines so that a straight oblique line is displayed as a straight line.

It is still a further object of the present invention to provide a double-scanning non-interlace television receiver which produces a high quality television picture free from objectionable flickering.

According to an aspect of the present invention, a double-scanning non-interlace television receiver for receiving an interlace television signal having alternating odd and even fields of scan lines which are normally interlaced, as displayed, comprises receiver means for receiving the interlace television signal and generating received line signals representative of the scanned lines of a field being received, visual display means, and non-interlace converting means connected to the receiver means for generating an averaged line signal from two consecutive received line signals and for serially supplying the averaged line signal and the consecutive received line signals to the visual display means for display by the latter, with each of the averaged line signals being supplied and displayed between the respective received line signals.

The above, and other objects, features and advantages of the present invention will be apparent from the following detailed description of an illustrative embodiment which is to be read in connection with the accompanying drawings.

BRIEF DESCRIPTION OF THE DRAWINGS

FIGS. 1a and 1b are diagrams illustrating the space integration effect of an interlace television receiver system;

FIGS. 2a and 2b are diagrams illustrating line flicker in a television receiver system;

FIGS. 3a to 3d are diagrams illustrating the zig-zag effect which occurs in the display of an oblique line in a non-interlace television receiver system;

FIGS. 5a to 5f are timing charts used to illustrate the television receiver system of FIG. 4;

DESCRIPTION OF THE PREFERRED EMBODIMENT

Figure 4:
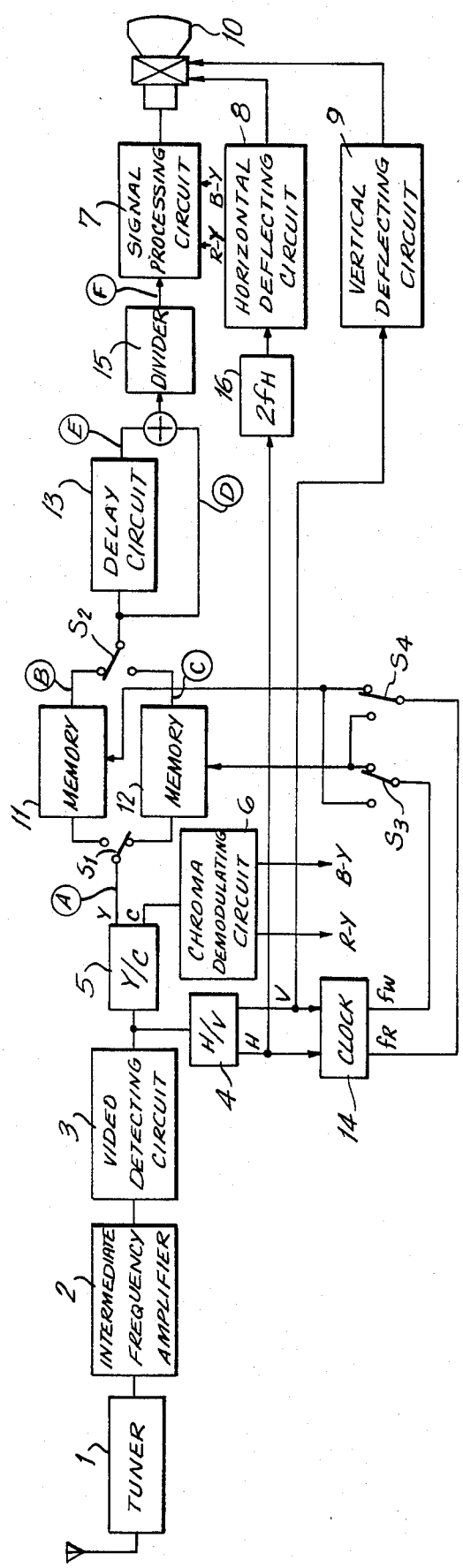
FIG. 4 is a block diagram illustrating an embodiment of the television receiver system in accord with the present invention.

FIGS. 1a and 1b diagrammatically illustrate close-up views of the scanning lines of a picture displayed on an interlace television system such as the NTSC system. There is no movement in the picture of FIG. 1a, so that all 525 scanning lines are used for the display. In FIG. 1b, rapid vertical movement of a circle is depicted and illustrates the problems inherent in an interlace scanning system. When the circle of FIG. 1b moves vertically faster than the second field comprising a frame can be displayed, the portions of the line forming the circle in the second field may not even depict the circle at all. Accordingly, only the scanning lines of the first field depict the circle. The 525 scanning lines of the system are perceived as only 262.5 scanning lines by human vision, and the picture is coarse. The coarseness of the picture becomes more pronounced in a large screen television, in which the lines are relatively widely spaced. Although there are many factors which determine the quality of the television, one of the most important factors is the coarseness of a scanning line. Because the scanning line is considered coarse in such an instance, the television picture quality is not considered to be high.

One solution to the problem of the coarseness of the scanning line is to double the number of lines scanned to produce, for example, an interlace system with 1050 scanning lines. A second solution is to scan every line to produce a non-interlace system with 525 consecutively scanned lines. There are, however, difficulties in displaying a picture from an NTSC television signal on television receivers constructed in accord with these solutions. In the interlace receiving system with 1050 scanning lines, flicker occurs between the upper and lower portions of a scanning line. In the non-interlace receiving system with 525 scanning lines, an oblique straight line is displayed as a zig-zag line because the physical position of the scanning line on the screen, when it is repeated, deviates from the physical position of the first line on the screen, and yet is generated by the same picture signal.

FIGS. 2a and 2d diagrammatically illustrate the flicker which occurs between the upper and lower portions of a scanning line. FIG. 2a illustrates a picture on an interlace television receiver system such as the NTSC system. FIG. 2b illustrates a picture on an interlace television receiver system having 1050 scanning lines, while FIG. 2c illustrates a picture on a non-interlace receiving system with 525 consecutively scanned lines. In the figures, picture signals a, b of FIG. 2d indicate changes in the picture signal in a direction perpendicular to the scanning lines. The X mark indicates that the brightness of the scanning line on the picture screen which corresponds to the signals a, b is dark. The O mark indicates that the brightness of the scanning line on the picture screen which corresponds to the signals a, b is light.

In FIG. 2a, scanning lines $L_1$, $L_2$, $L_3$ . . . in solid lines indicate the scanning lines of the odd field. Scanning lines $L_{264}$, $L_{265}$, $L_{266}$ . . . in broken lines indicate scanning lines of the even field. (The X marks and O marks of the scanning lines $L_{264}$, $L_{265}$, $L_{266}$ . . . of the even field are displaced to the right in the figures for ease of presentation). In the interlace receiver system having 1050 scanning lines of FIG. 2b, each scanning line of the even and odd fields comprising a frame in the television signal displayed with the interlace system of FIG. 2a are scanned twice. (The brightness of the scanning lines is illustrated in FIG. 2b.) Although the brightness of the sixth scanning line from the top, $L_{264}$, should be represented by the O mark for accurate display, it is instead represented by the X mark because of the repetition of the scanning lines. Accordingly, the picture flickers between the upper and lower portions of the scanning line.

In the picture displayed on the non-interlace television receiver system having 525 scanning lines of FIG. 2c, on the other hand, the X and O marks are superimposed on each other at the same position in lines $L_2$, $L_{264}$, so that the flicker of FIG. 2b is absent due to the time integration effect of human vision.

FIGS. 3a to 3d illustrate the zig-zag problem for an oblique straight line displayed with a non-interlace receiver system having 525 scanning lines. FIGS. 3a and 3c illustrate the brightnesses on the picture screen of the scanning lines, while FIGS. 3b and 3d illustrate the picture signals from which the scanning lines of FIGS. 3a and 3c are derived. The left slanted hatched areas indicate the black portions in the first field, while the right slanted hatched areas indicate black portions in the second field. When a straight oblique line is displayed on a screen of an NTSC receiver system as in FIGS. 3a and 3b, the scanning lines are coarse, but the line is straight. In the non-interlace receiver system having 525 lines, the position of alternate scanning lines deviates from the position to which the picture signals correspond, thereby causing a straight oblique line to be displayed as a zig-zag line, as depicted in FIGS. 3c and 3d. In a picture with no movement, a straight oblique line can perceived as straight because of the time integration effect of human vision. However, as described with reference to FIGS. 1a and 1b, the time integration effect of human vision is not effective when animation is depicted, so that a straight oblique line is seen as a zig-zag line.

FIG. 4 illustrates an embodiment of a double-scanning non-interlace television receiver in accord with the present invention. The receiver includes a tuner 1 connected to a video intermediate frequency amplifier circuit 2, a video detecting circuit 3, a synchronizing signal separating circuit 4, a luminance signal and chroma signal separating circuit 5, and a chroma demodulating circuit 6. A signal processing circuit 7, a horizontal deflecting circuit 8, and a vertical deflecting circuit 9 are connected to a color cathode ray tube (CRT) 10. Such components are known in the prior art.

Luminance signal and chroma signal separating circuit 5 includes a luminance signal output terminal Y which is connected through a switch $S_1$ to two memory units 11, 12, each of which stores, for one scanning line period of duration 1H, a received line signal derived from an interlace television signal. Memory units 11, 12 are also connected through a switch $S_2$ to a delay circuit or delay line 13 which delays a received line signal for a time period of duration H/2. Synchronizing signal separating circuit 4 supplies a horizontal synchronizing signal H and a vertical synchronizing V to a clock generator 14 which supplies a write clock signal having a frequency $f_w$ and a read clock signal having a frequency $f_r$ to actuate memory units 11, 12. Switches $S_3$ and $S_4$ alternately supply the write clock signal and the read clock signal to memory units 11, 12. Switches $S_1$, $S_2$, $S_3$, and $S_4$ are actuated in synchronism with horizontal synchronizing signal H and operate during the timing period in which one of memory units 11, 12 is in a write mode while the other memory unit is in a read mode. In FIG. 4, memory unit 12 is in the write mode, while memory unit 11 is in the read mode.

According to the preferred embodiment, the read operation is repeated twice during one write operation, so that the read clock frequency $f_r$ is selected to be twice the write clock frequency $f_w$. In one example of a television receiver in accord with the present invention, write clock frequency $f_w$ was selected to be about 14 MHz, while read clock frequency $f_r$ was selected to be about 28 MHz.

The output from delay circuit 13 is supplied to an adding circuit along with the received line signal stored in memory units 11, 12. The output of the adding circuit is supplied to a divider or attenuator 15 which halves the signal supplied thereto. Divider 15 supplies an output signal to signal processing circuit 7 for display on CRT 10.

A frequency multiplying circuit 16 receives horizontal synchronizing signal H from synchronizing signal separating circuit 4. Frequency multiplying circuit 16, in the preferred embodiment, doubles the frequency $f_H$ of horizontal synchronizing signal H before it is supplied to horizontal deflecting circuit 8.

The operation of the embodiment of the television receiver of FIG. 4 will now be described with reference to the timing charts of FIGS. 5a through 5f, which illustrate the signals appearing at the positions indicated by marks A, B, C, D, E, and F in FIG. 4, respectively. In FIG. 5a, NTSC signals of four successive scanning lines are denoted by numerals 1, 2, 3 and 4 for ease of presentation. When switch S$_1$ is connected to memory unit 11, switch S$_3$ is also connected to memory unit 11 so that received scanning line signal 1 is written in memory unit 11 during the 1H period indicated in FIG. 5b in dotted lines and by symbol W. During this time period, switch S$_2$ is connected to memory unit 12. In the following 1H time period, switch S$_1$ changes to be connected to memory unit 12, while switch S$_2$ changes to be connected to memory unit 11. Switch S$_3$ is connected to memory unit 12, while switch S$_4$ is connected to memory unit 11. Thus, received scanning line signal 1 written in memory unit 11 is read out twice during one time period 1H, as shown by the reference letters R in FIG. 5b, and signal 2 is written into memory unit 12. Signal 2 written into memory unit 12 is read out therefrom twice during the next 1H time period. In that time period, signal 3 is written into memory unit 11. Signal 2, which is read out twice, is delayed for a time period H/2 by delay circuit 13 and then added to the signal which was not delayed. Accordingly, the signals of $1 \times 1$, $1+2$, $2 \times 2$, $2+3$, $3 \times 3$ . . . , are generated at each H/2 time period. If these signals are averaged by multiplying by one-half in divider 15, luminance signals of 1, $(1+2)/2$, 2, $(2+3)/2$, 3, . . . are produced at every H/2 period, as illustrated in FIG. 5f.

The chroma signal supplied at chroma signal output terminal C of luminance signal and chroma signal separating circuit 5 is demodulated by chroma demodulating circuit 6 to derive color signals R-Y and B-Y. Color signals R-Y, B-Y are converted by a non-interlace converting circuit (not shown) similar to the one described in FIG. 4 to generate 525 double-scanning non-interlace signals, each of which is an average or mean value between two consecutive received line signals. The non-interlace signals from the chroma non-interlace converting circuit are then added with the luminance signals in signal processing circuit 7 for display on CRT 10. In the chroma signal non-interlace converting circuit, write and read clock signals have frequencies $f_w$ and $f_r$ which differ from the values described above with respect to the frequencies of the signals in the luminance non-interlace converting circuit of FIG. 4.

Figures 6, 7A, 7B:
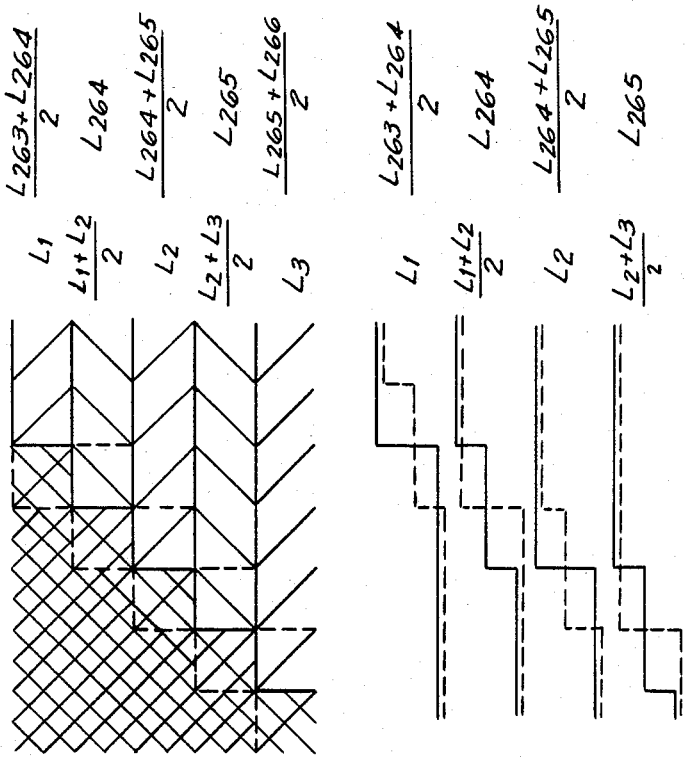
FIG. 6 is a diagram illustrating the absence of line flicker in television receiver system in accord with the present invention.
FIG. 7a and 7b are diagrams illustrating the absence of the zig-zag effect in an oblique line displayed with a television receiver system in accord with the present invention.

FIG. 6 illustrates the operation of an embodiment of the present invention and corresponds for explanatory purposes to FIG. 2. The triangular marks indicate a mean or average value between a black value, indicated by an X mark, and a white value, indicated by a O mark, and is, thus, a gray value. As is apparent from FIG. 6, there is no flicker in the display, just as illustrated in FIG. 2c.

In FIG. 7, which corresponds for explanatory purposes to FIG. 3, the mean or average value of the picture signals of the scanning lines immediately preceding and following the averaged scanning line is shown by cross-hatching with wide spaces. The right and left slanted hatched areas indicate dark areas. As illustrated in FIG. 7, the portions of an oblique line which would otherwise cause the line to be perceived as a zig-zag line are smoothed or averaged so that the line appears straight, and thus, the display is greatly improved.

In accordance with the present invention, a high quality television picture can be displayed without flicker, and an oblique straight line can be correctly displayed as a straight line.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. A double-scanning non-interlace television receiver for receiving an interlace television signal having alternating odd and even fields of scanned lines which are normally interlaced, as displayed, comprising:
   receiver means for receiving said interlace television signal and generating received line signals representative of said scanned lines of a field being received;
   visual display means; and
   non-interlace converting means connected to said receiver means for generating an averaged line signal from two consecutive received line signals and for serially supplying said averaged line signal and said consecutive received line signals to said visual display means for display by the latter, with each said averaged line signal being supplied and displayed between the respective received line signals, said non-interlace converting means supplying said received line signals of each said odd field and said averaged line signals derived therefrom to said visual display means, and then supplying said received line signals of the following even field and said averaged line signals derived therefrom to said visual display means, whereby each of said scanned lines is scanned twice on said visual display means, said non-interlace converting means including memory means for storing said received line signals, delay means connected to said memory means for delaying said received line signals, and summing means connected to said delay means and said memory means for generating the sum of two of said received line signals.

2. The television receiver of claim 1; wherein said non-interlace converting means further includes clock means for supplying clock signals to actuate said memory means.

3. The television receiver of claim 2; wherein said clock means generates storing clock signals to actuate said memory means to store one of said received line signals therein, and reading clock signals to actuate said memory means to read out one of said received line signals stored therein.

4. The television receiver of claim 3; wherein said storing clock signals have a frequency one-half the frequency of said reading clock signals.

5. The television receiver of claim 3; wherein said storing clock signals have a frequency of about 14 MHz and said reading clock signals have a frequency of about 28 MHz.

6. The television receiver of claim 3; wherein said memory means comprises first and second memory units, each for storing one of said received line signals.

7. The television receiver of claim 6; wherein said non-interlace converting means further includes switch means for alternately supplying said received line signals stored in said memory units to said delay means.

8. The television receiver of claim 7; wherein said non-interlace converting means further includes clock switch means connected to said clock means for suppling said clock signals to said memory units.

9. The television receiver of claim 8; wherein said clock switch means comprises a first switch for supplying said storing clock signals to said memory units and a second switch for supplying said reading clock signals to said memory units.

10. The television receiver of claim 7; wherein said non-interlace converting means further includes switch means for alternately supplying said received line signals to said memory units.

11. The television receiver of claim 1, in which said interlace television signal includes a luminance signal from which said received line signals are derived and a chroma signal; and wherein said receiver means includes:
  means for separating said luminance signal and said chroma signal from said interlace television signal; and
  means for supplying said luminance signal to said non-interlace converting means.

12. The television receiver of claim 11; wherein said receiver means includes:
  means connected to said means for separating for demodulating said chroma signal; and
  means for supplying said demodulated chroma signal to said visual display means for display thereon in synchronism with said received line signals.

13. The television receiver of claim 11; wherein said receiver means includes tuner means for tuning said interlace television signal.

14. A double-scanning non-interlace television receiver for receiving an interlace television signal having alternating odd and even fields of scanned lines which are normally interlaced, as displayed, comprising:
  receiver means for receiving said interlace television signal and generating received line signals representative of said scanned lines of a field being received, said received line signals having a horizontal time period for display;
  visual display means;
  clock means for generating storing clock signals and reading clock signals;
  non-interlace converting means connected to said receiver means for generating an averaged line signal from two consecutive received line signals and for serially supplying said averaged line signal and said consecutive received line signals to said visual display means for display by the latter, with each said averaged line signal being supplied and displayed between the respective received line signals, said non-interlace converting means supplying said received line signals of each said odd field and said averaged line signals derived therefrom to said visual display means, and then supplying said received line signals of the following even field and said averaged line signals derived therefrom to said visual display means, whereby each of said scanned lines is scanned twice on said visual display means, said non-interlace converting means including memory means actuated by said storing clock signals to store one of said received line signals therein and by said reading clock signals to read out one of said received line signals stored therein, delay means connected to said memory means for delaying said received line signals for approximately one-half said horizontal time period, and summing means connected to said delay means and said memory means for generating the sum of two of said received line signals, whereby said summing means alternately supplies signals which are respectively the sum of one of said received line signals and a delayed replica thereof and the sum of two consecutive received line signals.

15. The television receiver of claim 14; wherein said dividing means divides by two said signals supplied from said summing means.

16. The television receiver of claim 15, wherein said interlace television signal includes sync signals; and wherein said receiver means includes means for separating said sync signals from said interlace television signal and means for supplying said sync signals to said clock means whereby said clock means operates in synchronism with said sync signals.

17. The television receiver of claim 16, wherein said sync signals have at least two frequencies; and wherein said visual display means includes frequency multiplying means for multiplying at least one of said frequencies of said sync signals.

18. The television receiver of claim 17; wherein said frequency multiplying means doubles at least one of said frequencies of said sync signals.

19. The television receiver of claim 17; wherein said visual display means includes cathode ray tube means.

20. The television receiver of claim 17; wherein said visual display means includes horizontal deflecting circuit means and vertical deflecting circuit means.

21. The television receiver of claim 20; wherein said horizontal deflecting circuit means is connected to said frequency multiplying means.

* * * * *